United States Patent
Kroll et al.

(10) Patent No.: US 8,462,408 B2
(45) Date of Patent: Jun. 11, 2013

(54) HOLOGRAPHIC RECONSTRUCTION SYSTEM WITH AN OPTICAL WAVE TRACKING MEANS

(75) Inventors: Bo Kroll, London (GB); Armin Schwerdtner, Dresden (DE); Gerald Futterer, Dresden (DE); Stephan Reichelt, Dresden (DE); Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 688 days.

(21) Appl. No.: 12/601,014

(22) PCT Filed: May 21, 2008

(86) PCT No.: PCT/EP2008/056259
§ 371 (c)(1),
(2), (4) Date: Mar. 31, 2010

(87) PCT Pub. No.: WO2008/142108
PCT Pub. Date: Nov. 27, 2008

(65) Prior Publication Data
US 2010/0214634 A1   Aug. 26, 2010

(30) Foreign Application Priority Data
May 21, 2007   (DE) .......................... 10 2007 024 237

(51) Int. Cl.
*G03H 1/08* (2006.01)
(52) U.S. Cl.
USPC .......................................................... 359/9
(58) Field of Classification Search
USPC .......................................................... 359/9
See application file for complete search history.

(56) References Cited

U.S. PATENT DOCUMENTS
8,218,211 B2 * 7/2012 Kroll et al. ..................... 359/9

FOREIGN PATENT DOCUMENTS
| WO | WO 2004/044659 | 5/2004 |
| WO | WO 2004/075526 | 9/2004 |
| WO | WO 2004/099847 | 11/2004 |
| WO | WO 2006/119760 | 11/2006 |
| WO | WO 2006/119920 | 11/2006 |

OTHER PUBLICATIONS

International Search Report, dated Oct. 10, 2008, issued in priority International Application No. PCT/EP2008/056259.
Smith et al., "Agile wide-angle beam steering with electrowetting microprisms," Optics Express, vol. 14, No. 14, pp. 6557-6563 (Jul. 10, 2006) XP002497446.

* cited by examiner

Primary Examiner — Alessandro Amari
(74) Attorney, Agent, or Firm — Saul Ewing LLP

(57) ABSTRACT

A holographic reconstruction system is disclosed with spatial light modulation means, modulating interferable light waves from light sources with at least one video hologram, comprising optical focusing means, focusing the modulated light waves with the reconstructed object light points for at least one eye position for the eyes of observers and controllable electro-optical deflector means, which direct the focused modulated light waves with the reconstructed light points to at least one eye position in order to reduce the aberrations. The reconstruction system has the optical focusing means in a field of focusing elements, wherein each focusing element is provided with at least one interferable light source. The electro-optical deflector means lie in the light path of the interferable light waves after the optical focusing mean and have at least one field of deflector elements, which has at least one separately controllable electro-optical deflector element for each focusing element.

14 Claims, 6 Drawing Sheets

US 8,462,408 B2

HOLOGRAPHIC RECONSTRUCTION SYSTEM WITH AN OPTICAL WAVE TRACKING MEANS

CROSS REFERENCE TO RELATED APPLICATIONS

This application claims the priority of PCT/EP2008/056259, filed on May 21, 2008, which claims priority to German Application No. 10 2007 024237.0, filed May 21, 2007, the entire contents of which are hereby incorporated in total by reference.

FIELD OF THE INVENTION

The present invention relates to a holographic reconstruction system for the three-dimensional reconstruction of a scene with spatial light modulator means, which carry a holographic code, and with illumination means for illuminating the light modulator means.

The present invention chiefly relates to a real-time or near-real-time reconstruction of moving scenes with the help of a sequence of video holograms. A hologram processor computes video holograms and encodes them on a cell structure of spatial light modulator means which, when illuminated with light which is capable of generating interference, spatially modulate at least one propagating light wave field with holographic information. The modulated light wave field reconstructs the scene through interference of the diffracted light waves and thus propagates towards an eye position such that one or multiple observers can watch the reconstructed object light points as a three-dimensional reconstruction of a scene. This means that the reconstructed object light points represent the optical appearance of the scene in a three-dimensional manner in front of the eye positions.

TECHNICAL BACKGROUND OF THE INVENTION

In contrast to a stereoscopic representation, a holographic reconstruction realises an object substitute, which is why the problems known in conjunction with stereoscopy, such as fatigue of the eyes and headache, do not occur, because there is generally no difference between watching a real scene and a holographically reconstructed scene. The eyes of an observer can be served in a time- or space-division multiplexed presentation of different video holograms which differ in parallax.

High-resolution, flat light modulators which comprise several millions of modulator cells and which are used as screens in video and TV devices or projectors are for example particularly suited as light modulator means. Suitable light modulator means can be, for example, so-called liquid crystal on silicon (LCoS) modulators, where optical modulator elements with electronic circuits are disposed on a substrate or chip, transmissive LCD panels or electro-mechanically controlled micro mirror systems, such as micro electro-mechanical systems (MEMS), which comprise a combination of mechanical elements, actuators and electronic circuits disposed on a substrate or chip.

A light modulator means achieves the larger light diffraction angles the smaller the distance between the centres of the modulator cells, i.e. the cell pitch.

A reconstruction system is known from the international publication WO 2004/044659, titled "Video hologram and device for reconstructing video holograms", which employs for spatial light modulation a liquid crystal display (LCD) screen with conventional resolution, as used for television and video image representations. The reconstruction system comprises focussing means which are disposed between the illumination means and the light modulator, and it makes it possible to holographically reconstruct a scene with the help of a conventional liquid crystal display, which has a modulator resolution that is relatively low compared with other solutions used in video holography. The reconstructed scene is visible with great spatial depth and good resolution in a reconstruction space through a visibility region which lies near an eye position of an observer. A viewing angle which is determined by the diagonal of the liquid crystal display screen can be used for the holographic reconstruction.

When using a light modulator which was designed for conventional image representation in holography, it is disadvantageous that the light modulator exhibits a diffraction angle which is rather small for holography, due to a typical distance of approx. 200 μm between the modulator cells. This makes it impossible for a reconstruction to be watched simultaneously with both eyes through a single visibility region. For such small visibility regions which are limited by the resolution, the prior art reconstruction system has it that separate visibility regions are generated sequentially for each eye of the observer. This means that, while a video hologram is active, the system alternately directs a wave field which is modulated with hologram information at the observer eyes for a fraction of the period of a video hologram. This makes great demands on the working speed of the light modulator means.

The reconstruction system according to the publication WO 2004/044659 thus additionally discloses a possibility for directing and tracking the position of multiple visibility regions. In particular, the reconstruction system realises a mechanical or electronic offset of the light sources laterally to the optical axis of the system using moving mirrors or multiple differently positioned light sources for displacing the light source images which generate the visibility regions for perceiving the reconstruction. When the observer moves, the light sources are repositioned in space such that the visibility regions follow the observer eyes.

It is disadvantageous that in a large tracking range, substantial aberrations, which occur when light passes through the focussing means, adversely affect the reconstruction of the spatial scene. The aberrations occur because the light passes through the focussing means at different angles, depending on the eye position, in order to reconstruct a scene. Because the object light points are reconstructed by wave interferences of diffracted partial light waves, such aberrations can cause image errors of a type not known from conventional video image representations as a result of phase and runtime errors. For example, other partial light waves than intended when computing the hologram according to the holographic source signal can interfere and generate misplaced object light points or additional object light points compared with the original scene.

In the international publication WO 2006/119920, titled "Device for holographic reconstruction of three-dimensional scenes", the applicant also discloses a device which uses at least one visibility region which is smaller than the modulator surface of the light modulator at an eye position for watching the reconstruction. In that system, an array of light sources which are capable of generating interference and which are arranged in a matrix illuminates the modulator surface, and the focussing means comprise a multitude of imaging elements, e.g. convex lenses, which are adjoined mechanically so to form a flat array of focussing means. Each imaging element of the array of focussing means is assigned to at least one light source which is capable of generating interference, so to generate a bundle of illumination units which jointly illuminate the modulator surface, where each illumination unit only passes through a sub-region of the modulator surface. The light sources which are capable of generating interference in the illumination units are positioned such that the imaging elements of the array of focussing means image their assigned light source to an eye position. In other words, each illumination unit transmits a partial light wave through a sub-region of the modulator surface and, after a separate modulation by the individual sub-regions, the partial light waves overlap so to form a common visibility region.

According to a continuation of the known solution, for directing and tracking the position of the visibility region to changing eye positions, the light sources are designed as a plane backlight, and an additional controllable modulator matrix with modulator cells which can be switched to a transparent mode, for example a so-called LCD shutter array, opens, depending on the current eye position which is detected by a position detection system, for each imaging element of the array of focussing means a point light exit for the light which is capable of generating interference and which is focused on the eye position by the imaging elements. This generates a pattern of modulator cells which are switched to a transparent mode. In the case of a lateral change of the eye position, the position of the visibility region will be adjusted in that a system controller laterally displaces the pattern of the modulator cells which are switched to the transparent mode accordingly. In the case of an axial change of the eye position, the system controller will modify the distances between the modulator cells in the pattern which are switched to the transparent mode. The mentioned publication also discloses the usage of a switchable light source array with discretely controllable point light sources in order to realise the described process of directing and tracking the light wave field.

However, it has shown that the process of directing and tracking the position of the visibility region by adjusting the propagation of the light wave field according to the described solution exhibits several disadvantages. On the one hand, only a small fraction of the light energy can contribute to the reconstruction if an additional switchable modulator matrix is used, while the additional switchable modulator matrix absorbs the majority of the light emitted by the light source array.

On the other hand, a discretely switchable light source array or an additional switchable modulator matrix would be necessary which had to exhibit a much higher resolution than the light modulator. It is extremely complicated to provide such a light source array or such a switchable modulator matrix.

Both solutions also have a further major disadvantage which is that the coherent light of the backlight passes through the imaging elements of the array of focussing means at differently inclined transmission angles. The inclination of the transmission angle depends on the observer position and, depending on the actual eye position, results in substantial aberrations which are extremely difficult to compensate due to their dynamic nature. Moreover, those aberrations vary among the individual partial light waves because the propagation directions of the partial light waves towards the current eye position also differ.

Besides the mentioned solutions, the applicant also describes in the international publication WO2006/119760, titled "Projection device and method for the holographic reconstruction of scenes" a holographic projection system which uses a micro display with a diagonal of a few centimeters as light modulator. The device generates a visibility region for an eye position, similar to the previously described solutions. However, in contrast to the preceding solutions, where the light modulator forms the optical system exit of the modulated wave field and where the maximum viewing angle for the reconstruction is defined by the diagonal of the light modulator, that solution realises a projection device. In that device, a focussing display screen defines the maximum viewing angle and additional optical expansion means expand the wave field which is modulated with holographic information to the size of the display screen. A first imaging means images a video hologram which is encoded on the light modulator in an enlarged manner onto a focussing display screen, which images a spatial frequency spectrum of the video hologram to an eye position. The publication further discloses at least one controllable deflection element which is disposed inside the device and which serves for tracking the observer window according to the actual position of the observer eye. Such deflection elements can be mechanical, electrical or optical elements. The deflection element can for example be disposed in the plane of the first imaging means in the form of a controllable optical element which deflects the modulated wave field like a prism. However, it is also possible to dispose the deflection element near the display screen. This deflection element then realises the effect of a continuously controllable prism and, optionally, also the effect of a lens. The observer window is thereby tracked laterally and, optionally, axially. However, because a deflection element near the display screen serves to deflect the already modulated and enlarged wave field without disturbing the phase structure and the set interference conditions for the reconstruction of the scene, a modulator cell array which shall realise said aim must exhibit additional features which cannot be found in the publication.

All reconstruction systems described above use light modulator means with a discrete cell structure and a cell resolution which is rather low for holographic applications. On the one hand, as is generally known, the discrete cell structure causes a periodic continuation of the holographic reconstruction in other diffraction orders of a diffraction interval, so that the visibility may be impaired. On the other hand, the mentioned distance between adjacent modulator cells results in a relatively small diffraction angle, so that in practice a diffraction order with a diagonal of a few millimeters up to few centimeters is available for an undisturbed visibility of the reconstructed scene. It thus makes sense to combine the system controller of such a device with a position detection and tracking module. That module directs with the help of wave tracking means the modulated light waves at the current eye position, adjusts the position of the visibility region according to the eye position and tracks the light wave field each time the eye position changes.

Moreover, the light sources need to be positioned mechanically or, if the light source position is controlled electronically, a high spatial resolution of the light source field needs to be provided. In that case, the array of light sources must comprise a multitude of point light sources for each imaging element of the array of imaging means.

A controllable electro-optical cell, a so-called electrowetting cell, is known from the international publication WO 2004/099847, titled "Electrowetting cell". These cells take advantage of the capillary effect and electrowetting effect in order to modify the surface tension of liquids using electrostatic potential and so to control the optical refraction behaviour. An electrowetting cell basically comprises a capacitor which is filled between the electrodes with a hydrophobic liquid, such as an oil, and water, where one of the electrodes is coated with a hydrophobic material. Without an electric field being applied, the oil covers the coated electrode as a film, and with an electric field being applied, the water displaces the oil film, because the applied field compensates the polarisation of the dipoles in the water surface. The cell can realise electronically controllable optical lenses and prism elements with a surface area ranging from below one square millimeter down to a few square micrometers.

An autostereoscopic image display device according to the international publication WO 2004/075526, titled "Autostereoscopic display" emits image light points horizontally in a multitude of directions without a tracking device. The image display device has a backlight which emits collimated light which propagates through the image light points of an image representation device towards an array of optical deflection means with dynamically controllable deflection behaviour. The optical elements are in particular electrowetting cells which are used as controllable lenses, and which realise a dynamically adjustable beam controller. In order to avoid the image representation having to be tracked to the current eye position of observers, a system controller frequently modifies with the help of the controllable array of optical deflection means both the exit angles of the light and the image content of the image representation device during each period of the video image. Thereby, up to one hundred emission directions are served in each video period using a combination of space-division and time-division multiplex methods, said emission directions lying closely side by side horizontally thus forming image sectors, so that each observer eye sees video images which differ in parallax without the need of tracking. The optical deflection means thus pan the beams which are temporally differently modulated by the image representation device over the multitude of the image sectors which lie closely side by side. The publication does not disclose any technical means which would explain how the system controller can deflect a modulated wave field which is capable of generating interference with the help of the array of optical deflection means.

In contrast to the subject of the present invention, the international publication WO 2004/075526 relates to an autostereoscopic image display device which does not reconstruct object light points in a holographic manner as a three-dimensional arrangement in a viewing space. Instead of the reconstructed object light points, an autostereoscopic image display device displays two-dimensional images in the modulator plane, said two-dimensional images having the form of luminous image points which carry multiple image information for both observer eyes. That system uses neither light diffraction nor light interference. The dynamically adjustable beam controller is designed to deflect bundles of rays with incoherent light in a simple manner and does not make any demands on the conditions for mutual interference of the deflected light beams. The bundles of rays, which lie close to each other, are in particular not able to prevent light of parasitic diffraction orders from entering. Moreover, a non-linear transmission behaviour in the boundary zones of the electrowetting cells would affect the propagation of the modulated light waves which are capable of generating interference, and would substantially disturb the interference behaviour of the reconstruction system and thus the quality of the reconstruction.

The publication does not disclose any technical means which would explain how the system controller can deflect a modulated wave field which is capable of generating interference with the help of the array of optical deflection means and how the effects of parasitic diffraction orders can be circumvented.

SUMMARY OF THE INVENTION

The object of the present invention is to provide a holographic reconstruction system with a wave tracking means for a propagating wave field while doing without a switchable modulator cell array or switchable light source array with discretely controllable point light sources for directing the wave field, and thereby sidestepping its low luminous efficiency. Both the number of optical components through which the light passes and the demands made on the optical components of the system shall be minimised, so that the structure of the modulated light waves remains widely constant irrespective of the current eye position of an observer, and that the optical path causes each modulated light wave to take as little transit time and to have as little phase errors as possible, in order to make a correction of the optical wave propagation possible. Moreover, the optical transmission behaviour of the optical components of the wave tracking means shall be adapted to the strict conditions needed to generate interference in the wave field, so that the object light points of a three-dimensional scene are reconstructed free of errors as regards their local position in the structure of the scene and their light intensity values which shall be as close to the original as possible.

The present invention is based on a holographic reconstruction system according to the international publication WO 2006/119920, which uses a small visibility region—compared to the modulator surface area—at an eye position for watching the reconstruction, and which comprises for a three-dimensional reconstruction of object light points of a scene spatial light modulator means with modulator cells which modulate light which is capable of generating interference and which is emitted by a light source array with at least one video hologram. The reconstruction system further comprises optical focussing means, which image the light emitted by the light source array to a focussing plane. A system controller with a hologram processor for re-computing video holograms and with an eye finder directs the modulated light waves with the reconstructed object light points at least one current position of observer eyes, which corresponds with the current hologram content, and tracks it accordingly when the current eye position changes. Since the holographic reconstruction system according to the present patent application sequentially provides wave fields with hologram contents which differ in parallax for the eyes of observers during the period of a single video hologram of a video sequence, the eye position shall be construed in the present application to be the current eye position for which the light modulator means are actually encoded.

The light modulator means modulate the light wave field such that it reconstructs the object light points in front of the current eye position irrespective of the directing and tracking of the light waves.

In the present system, a light source array with light sources which are capable of generating interference and which are arranged in a matrix illuminates the light modulator means, and the focussing means comprise a multitude of imaging elements, e.g. convex lenses, which are adjoined mechanically so to form a flat array of focussing means. Each imaging element of the array of focussing means is assigned to at least one light source which is capable of generating interference, so to generate a bundle of illumination units which jointly illuminate the light modulator means, where each illumination unit only passes through a sub-region of the surface area of the light modulator means.

In contrast to the solution known from the publication WO 2006/119920, in the solution according to the present patent application the light sources are positioned in the illumination units such that the light which is capable of generating interference passes the imaging elements of the array of focussing means substantially parallel to the optical axis of the imaging element.

According to this invention the reconstruction system comprises at the point of exit of the modulated wave field, preferably behind the light modulator means in the optical path, electro-optical deflection means, which comprise at least an array of deflection means with optical cells whose direction of light exit can be controlled.

The controllable optical cells of the array of deflection means preferably have the same matrix structure as the array of focussing means and the array of light sources, so that each light source and each focussing element is assigned to at least one controllable optical cell.

This condition serves to make sure that the light emitted by the array of light sources passes through the imaging elements in the array of focussing means and the controllable optical cells parallel to the common optical axis and parallel to the optical axis of the light modulator means. This prevents optical aberrations and partial shading of the propagating wave field.

According to another feature of the present invention, the system controller controls the electro-optical deflection means of the array of deflection means based on position signals which are detected by the eye finder alternately such to serve an eye position which is determined by the content of the active video hologram, so to direct the modulated light wave field alternately at a current eye position of at least one observer.

To compensate phase errors and to achieve a continuous phase among the partial light waves of adjacent controllable optical cells of the array of deflection means, the hologram processor computes and takes into account corresponding value corrections depending on the current eye position when encoding the modulator cells of the light modulator means.

The array of deflection means is preferably disposed as close as possible to the light modulator means, seen from the observer position. This makes it possible for the reconstructed scene to be situated at a fix position in front of the optical system exit.

The electro-optical deflection means of the array of deflection means for example realise a controllable optical prism function. This way, the reconstruction system can switch between directions of propagation of the modulated wave field to several eye positions in the viewing space several times during the period of a video hologram of few milliseconds. With the help of the eye finder, the system controller adapts the direction of propagation of the propagating wave field to a changing eye position. In addition to the prism function, the array of deflection means can also realise a combined prism and lens function in order to deal with axial position changes. This makes it possible to adapt both the exit-side focus and the direction of the light waves to the current eye position.

From its generation up to the deflection means, the light which is capable of generating interference follows a static optical path which is independent of the eye position. Aberrations caused by optical elements can thus be compensated easily with electronic means, i.e. by applying correction values during the encoding process, or with known optical correction means.

The arrangement of the deflection element near the exit pupil of the holographic system is particularly preferable because the entire imaging system from the light source to the second imaging means is then a static system. This means that the optical path up to this imaging means will always be constant. This minimises the demands made on those parts of the optical system, because the aperture of the focussing means can be kept at a minimum.

These measures according to the present invention substantially reduce the demands made on the imaging means used.

Moreover, the imaging properties of the static section of the optical system can be corrected optimally. Further, the image of the light modulator means does not move within the reconstruction system. This makes the position of images within the system independent of the observer position.

In a preferred embodiment, the controllable deflection means are combined with the focussing means.

In a preferred embodiment of the invention, the controllable deflection means have at least one electrowetting cell per focussing element of the focussing means.

A two-dimensional lateral wave tracking, i.e. horizontal and vertical to the optical axis, is for example realised by two array planes with deflection elements which lie in the optical path, where the deflection angles of the deflection elements of the two array planes are disposed at an angle of 90° to each other. However, it can alternatively be realised with deflection elements whose deflection angle can be controlled in multiple dimensions.

In a preferred embodiment, each deflection element of the array of deflection elements is discretely controlled to individually modify the deflection angle of the light waves.

In this case it is in particular possible that all light sources of the array of light sources and all focussing elements of the array of focussing means are disposed at a fixed position and aligned with each other.

In order to compensate an axial movement of the eye position, the computer means which compute the current video hologram can encode a lens function in addition to the holographic information.

In a further embodiment, the optical deflection means comprise mechanically adjoined controllable optical elements which unite a lens function and a prism function. A position detection system controls with the help of these optical elements the focal length of the lens function so to axially position the visibility region and to direct the wave front with the visibility region laterally at the eye position.

In a still further embodiment of the present invention, the optical deflection means comprise combined controllable optical elements which unite a mirror component and a prism component. The position detection system preferably allows axial tracking by way of controlling the focal length of the mirror component, and lateral tracking of the light beams by way of controlling the prism component, according to the changing positions of the observer eyes.

In a further embodiment, the optical deflection elements are combined with optical elements which unite a fix prism component and a controllable prism component.

The fix prism component can realise the deflection of the light beams to a central eye position, so that the controllable prism component is only required to serve small angles and thus only needs lower control voltages.

The reconstruction system according to this invention is also suitable for small visibility regions where separate video holograms which differ in parallax sequentially provide a reconstruction for each observer eye. In this case the system controller switches over periodically in synchronism with the currently encoded video hologram.

For a colour reconstruction of scenes, colour video holograms can be encoded sequentially. A possibly occurring colour dispersion can then be compensated by controlling the deflection angles of the deflection means. For example, prism angles can be controlled such that they realise the desired deflection for the active colour.

In another embodiment, the optical deflection means have the form of achromatic elements, so that they achieve the same deflection angle for multiple wavelengths in order to reconstruct a colour hologram.

SHORT DESCRIPTION OF FIGURES

Now, the present invention will be described in detail with the help of figures, where FIG. 1 shows a holographic reconstruction system according to the international publication WO 2006/119920 with directed illumination of the light modulator means, light sources and focussing means.

DETAILED DESCRIPTION OF THE INVENTION

In the following embodiments, an electronic system controller SC encodes sequences of video holograms directly on a large-area flat screen of a type known from video and TV technology, such as an LCD panel, which directly serves an observer as a display screen, and which has a surface area which is as large as possible so to achieve a large viewing angle when watching the reconstruction.

Figure 1:
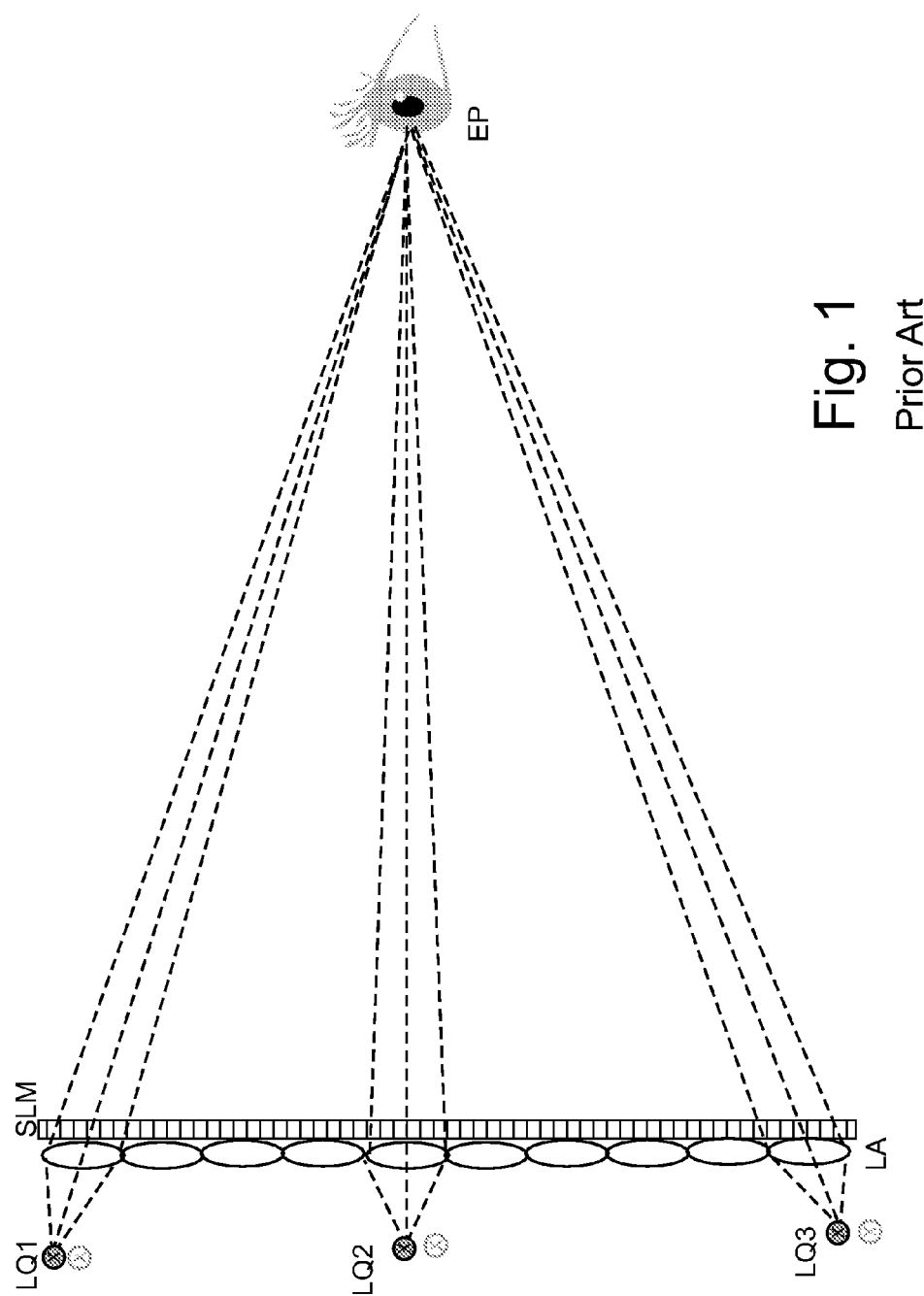

FIG. 1 shows a holographic reconstruction system according to the initial prior art solution with selected point light sources LQ1, LQ2 and LQ3, which emit light which is capable of generating interference, and which are part of an array of light sources. The array of light sources comprises for each imaging element of an array of focussing means LA a corresponding point light source LQ1, LQ2 or LQ3, which emit light which is capable of generating interference. Each imaging element of the array of focussing means LA forms together with a corresponding light source an illumination unit for illuminating the modulator cell structure of the spatial light modulator SLM.

Irrespective of its resolution with modulator cells, the spatial light modulator SLM can be illuminated with a number of illumination units which is as large as possible so to achieve a high luminance of the reconstructed object light points.

In the present embodiment, the imaging elements of the array of focussing means are micro-lenses of a micro-lens array which image their corresponding light sources to an eye position EP in a focal plane. The positions of the light sources which emit light which is capable of generating interference are adjusted in relation to the assigned micro-lens such that the light sources which emit light which is capable of generating interference which coincide the light sources LQ1, LQ2 and LQ3 at the eye position EP. However, the imaging elements can be any kind of focussing optical elements which are arranged in an array and which realise the function of convex lenses. The imaging elements can in particular also be holographic optical elements.

A hologram processor (not shown) of the system controller encodes the spatial light modulator SLM with a sequence of video holograms, so that modulated light waves propagate towards an eye position and one or multiple observer(s) can watch the spatially reconstructed scene from their eye positions in a visibility region.

Generally, the coincidence can be supported by using a field lens. In the simple embodiment, this is omitted though, and the position of the light sources is displaced in relation to the lenses such that the imaging elements of the array of focussing means LA image the light sources LQ1 ... LQ3 at the eye position EP in a common focal point.

Figure 2:
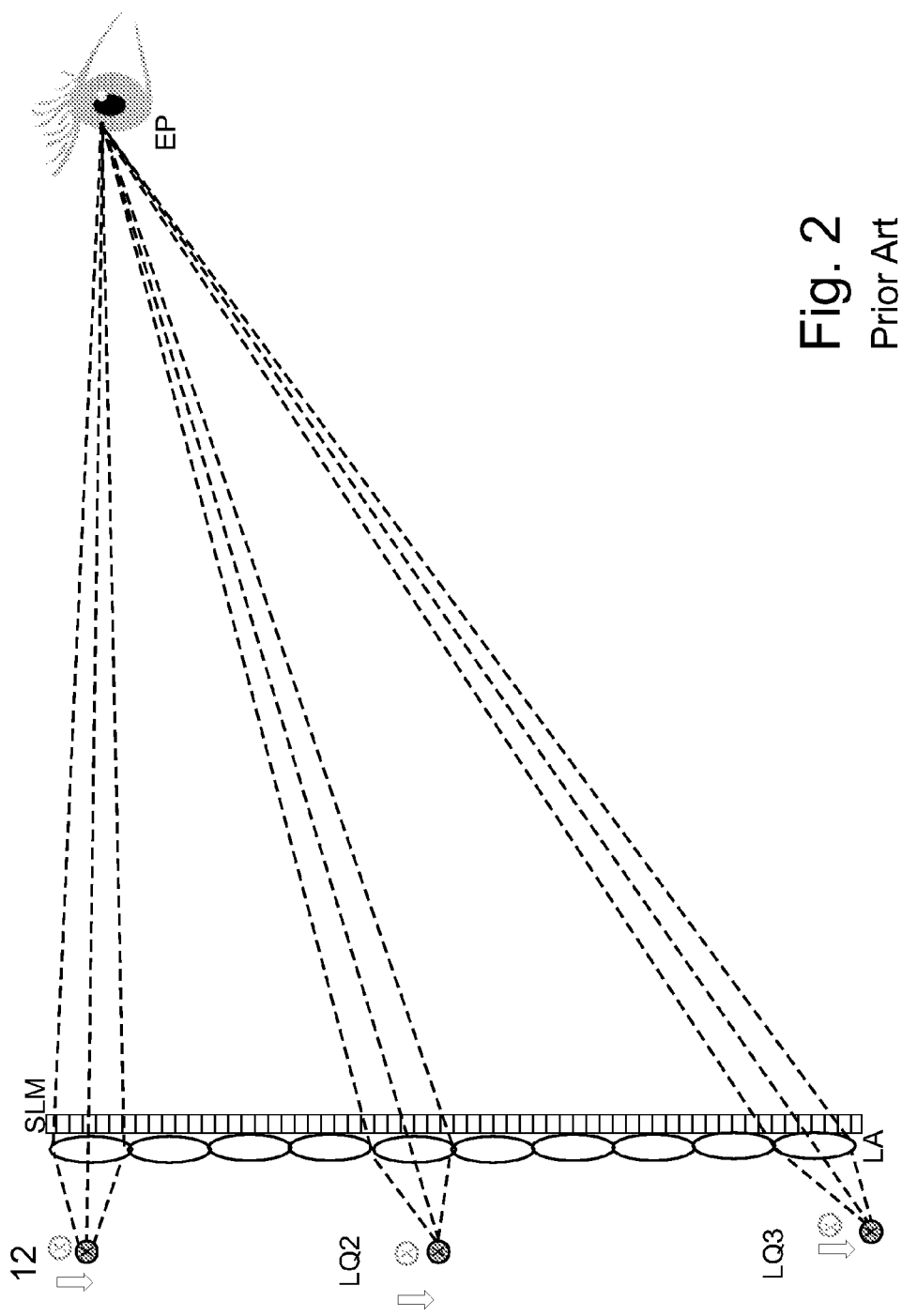
FIG. 2 shows the holographic reconstruction system according to FIG. 1 which directs the modulated light waves at an eye position by way of displacing the positions of the light sources.

FIG. 2 shows a possibility of tracking the modulated partial light waves to the current eye position without the means according to this invention. The position of the individual light sources LQ1, LQ2 and LQ3 is displaced mechanically such that the imaging elements of the array of focussing means LA image the light sources to a changed observer position EP.

If the imaging elements are lenses, then the imaging properties can usually only be optimised for one position of the light source in relation to the micro-lenses. If the angle of light source and centre of the micro-lens changes, then aberrations will occur which adversely affect the reconstruction of the hologram.

Figure 3:
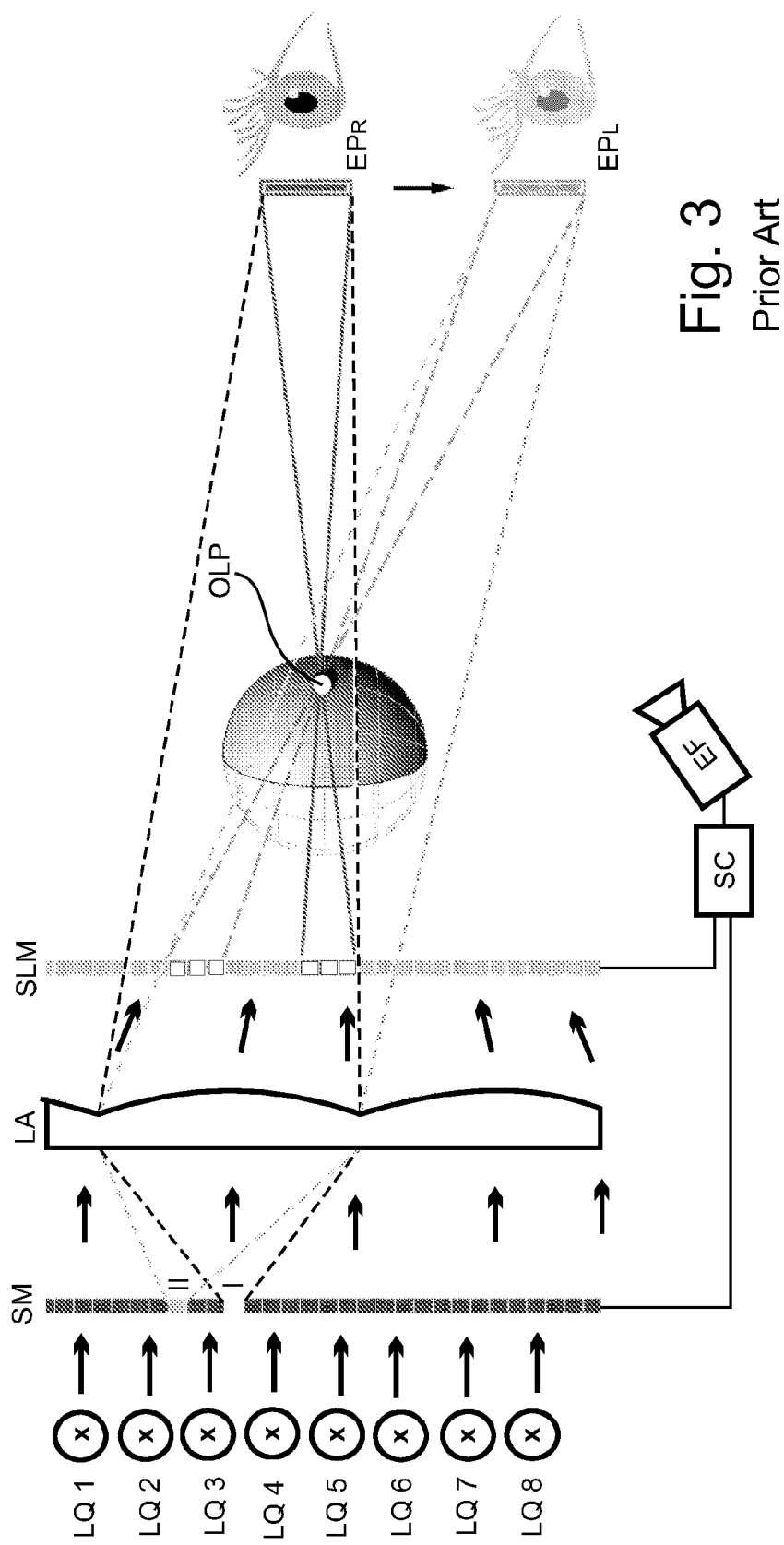
FIG. 3 shows the holographic reconstruction system according to FIG. 1, illustrating the encoding of the light modulator SLM for a single object light point OLP of a three-dimensional scene.

FIG. 3 also shows an example of tracking the modulated light waves to the current eye position without the means of this invention. In contrast to FIG. 2, FIG. 3 shows a light source array with a much higher number of light sources, which forms a plane backlight, and the above-mentioned additional switchable modulator matrix SM which comprises modulator cells which can be switched to a transparent mode, a so-called LCD shutter array. Depending on the current eye position, which is detected by an eye finder EF, the modulator matrix SM opens for each imaging element of the array of focussing means LA a point-shaped light exit I or II for the light which is capable of generating interference, which is focused on the right eye position $EP_R$ or to the left eye position $EP_L$, respectively, by the imaging elements. This generates a pattern of modulator cells which are switched to a transparent mode on the modulator matrix SM. The system controller SC opens for each imaging element of the array of focussing means LA only one light exit I or II which corresponds to the current eye position, and the hologram processor only encodes a sub-region of the modulator cell structure for each object light point.

This ensures that in the used diffraction order only modulated light from the opening I propagates to the current eye position $EP_R$ for reconstructing the single object light point OLP, which serves as an example here. The eye position $EP_L$ is thereafter provided with a reconstruction by re-encoding the spatial light modulator and switching to opening II.

Figure 4:
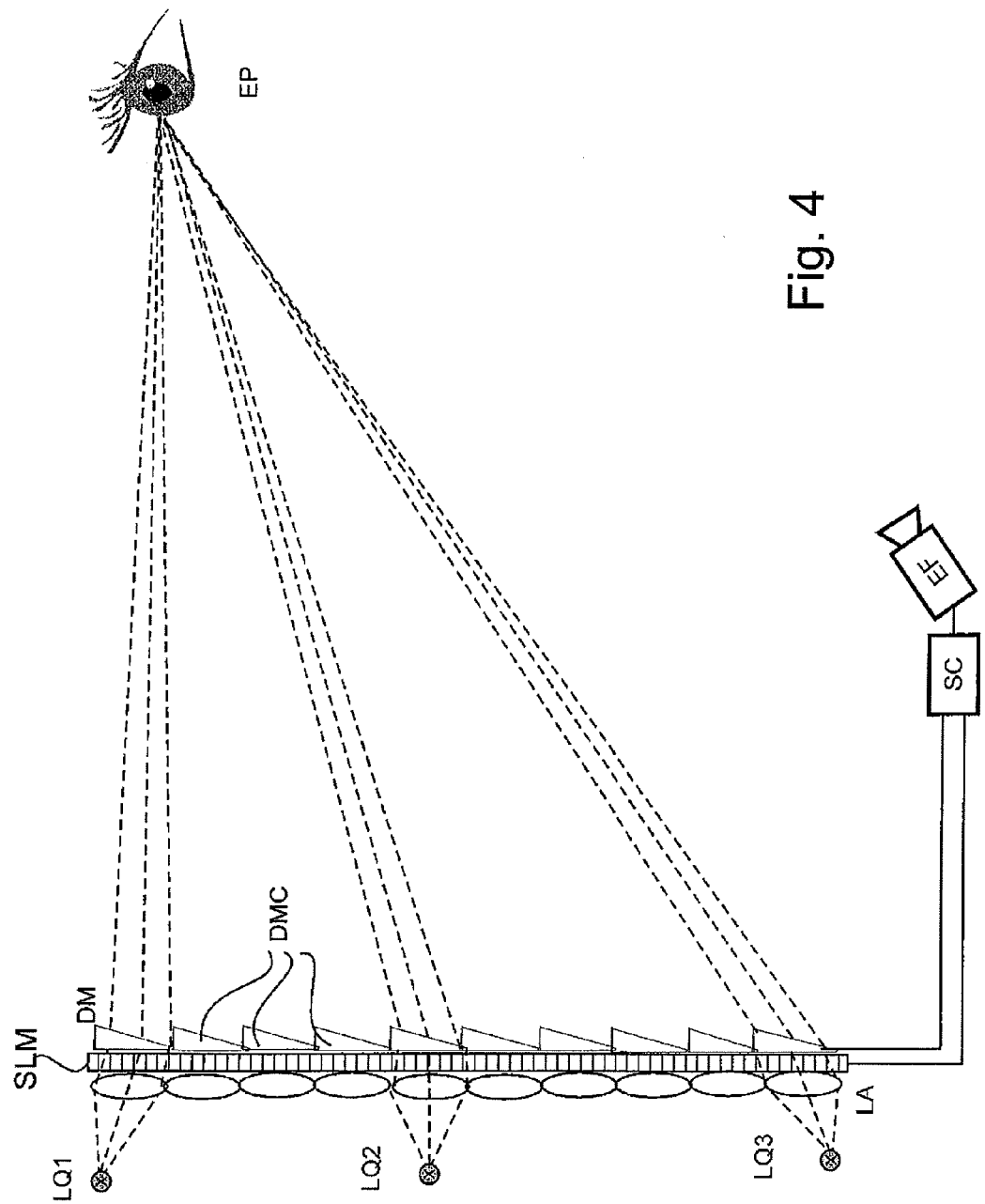
FIG. 4 shows a holographic reconstruction system with an array of deflection means according to this invention, which comprises controllable optical cells for directing and tracking the modulated light wave front according to this invention.

FIG. 4 shows a reconstruction system with a wave tracking means with means according to this invention. In this embodiment, an array of controllable electro-optical deflection means DM in the form of a micro-prism array with optical cells DMC whose light exit direction can be controlled, e.g. in the form of an array of prior art electrowetting cells, where prisms which are controlled by electric fields direct the modulated light waves at eye positions, lie on the light modulator SLM.

In the system described above, the optical path from each light source LQ to the corresponding focussing element and the passage on the light modulator is always the same, irrespective of the actual eye position. However, the optical path is different for each imaging element of the array of focussing means LA, so that each lens must be optimised individually. This can be done in a particularly preferably way by using a holographic optical element instead of a refractive micro-lens array.

In that case, the prisms of the array of deflection means DM, which are set by the system controller in the controllable optical cells DMC, and which track the partial light waves, all have the same angle. This would allow a simple addressing of a prism array using few parameters only.

Figure 5:
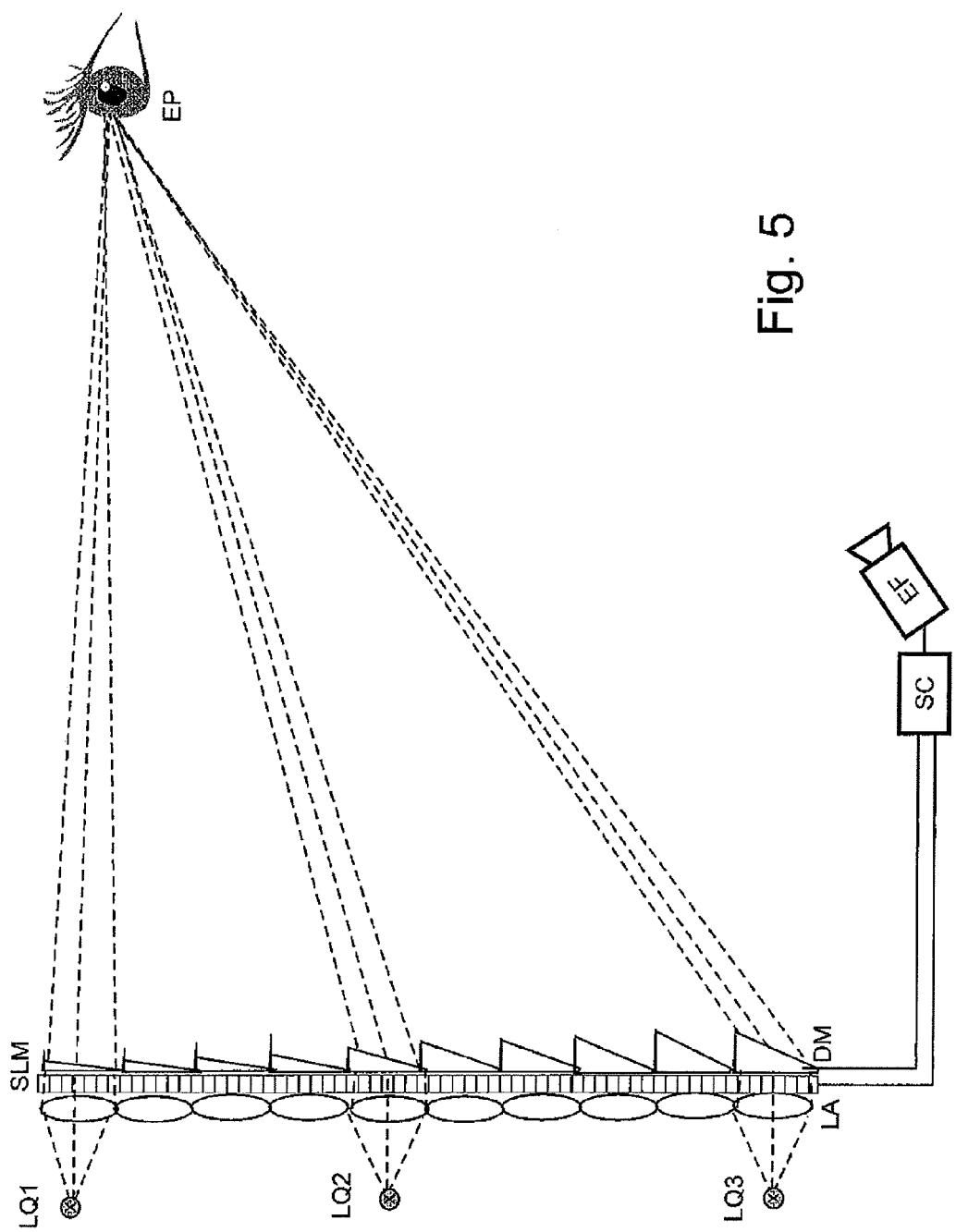
FIG. 5 shows a holographic reconstruction system according to another embodiment of this invention where a system controller directs and tracks the modulated light wave front with the help of the controllable optical cells without the partial light waves which are capable of generating interference having been directed before.
Figure 6:
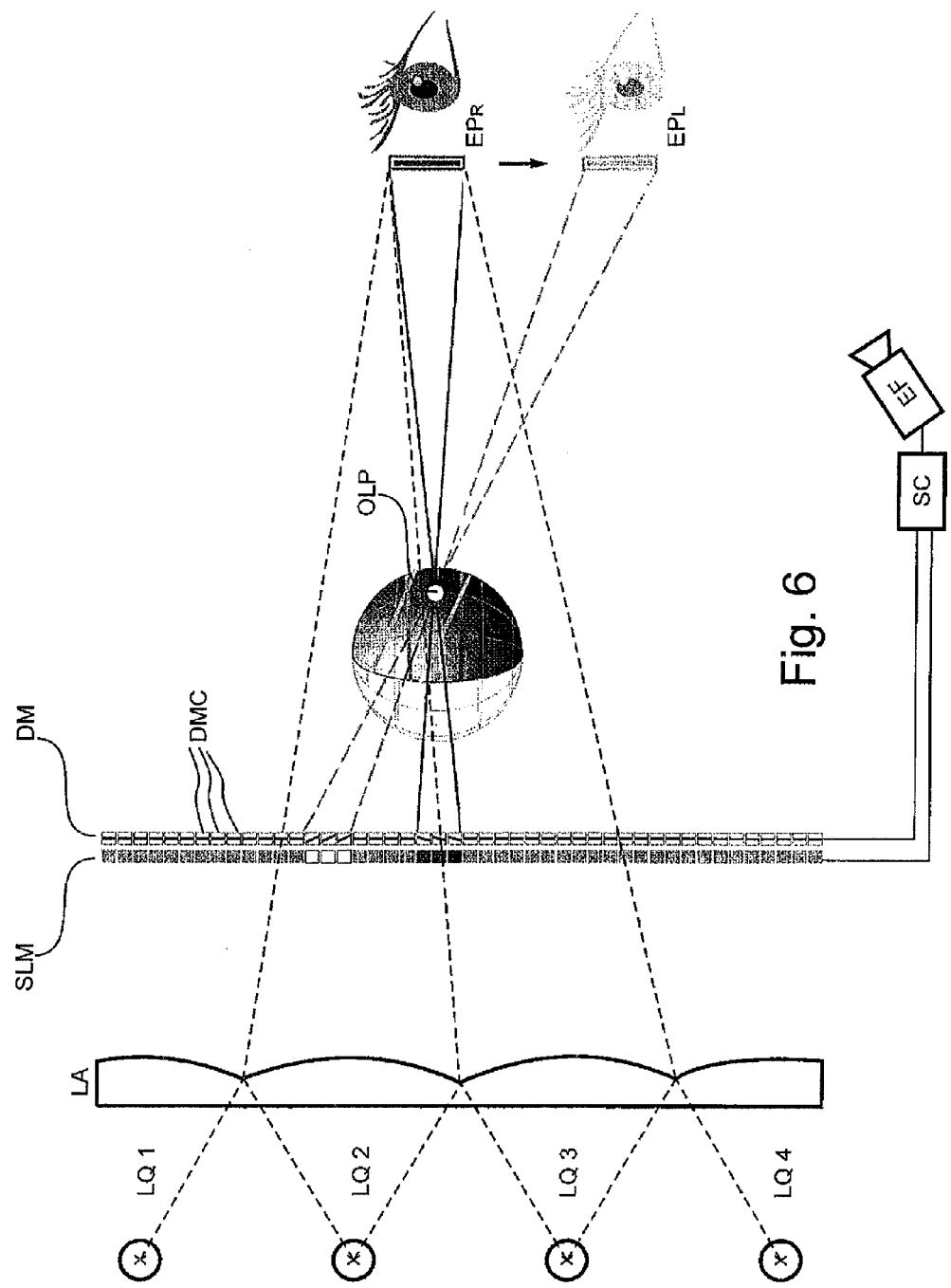
FIG. 6 shows another embodiment of the holographic reconstruction system according to this invention.

FIG. 5 shows another realisation of tracking the modulated partial wave fields to the observer eyes according to this invention.

All imaging elements of the array of focussing means LA are here illuminated with an identical position of the light source in relation to the centre of the imaging element. A matrix of identical imaging elements can be used. Instead, each prism of the array of deflection means DM can be set at an individual angle. In that case, the function of a field lens is integrated in the array of deflection means DM.

However, this would require discrete addressing of each controllable optical cell DMC in the array of deflection means DM.

In another embodiment, an array of deflection means which comprises a combination of fix and variable prism terms can be used. In particular the fix prism term can there adopt the function of a field lens, i.e. direct the light of all imaging elements at a central eye position of the observer, while the variable prism term is then the same for all prisms for mere lateral tracking at an average eye distance, but although different for axial tracking, less variable than shown in FIG. 4.

When combining an array of deflection means DM with an array of focussing means LA, each imaging element of the array of focussing means LA can be assigned to one prism of the array of deflection means DM, but this is not necessarily required, as shown in the exemplary drawings.

Other combinations are also possible, where for example each lens of the lens array is assigned to multiple smaller prisms, or where lenses and prisms are not assigned in any fixed manner at all.

In another embodiment, the deflection means are an array of liquid prisms according to the principle of electrowetting cells, each which comprising a hollow body which is filled with an optically transparent liquid according to an embodiment. The surface of the liquid has specific contact angles where in contact with the walls of that hollow body. The contact angles of the liquid in the hollow body are constant for given, temporally unchangeable geometries, materials and conditions, and they can be found with the help of Young's equation. If an electric field is applied e.g. in the dielectric system between the liquid and one of the walls of the hollow body, or between two opposing side walls of the hollow body, the equilibrium conditions will change, and thus the contact angles formed between the surface of the liquid and the side walls of the hollow body will change. This electrowetting effect can be described with the help of Lippmann's equation. The contact angles and thus the shape of the liquid surface are modified by varying one or multiple electric fields, thereby changing the deflection of the transmitted light beam in accordance with the laws of refractive optics.

For example, the hollow body can be cylindrical and have a rectangular base, so that opposing side walls form pairs of electrodes of a capacitor. Electrically insulating layers, preferably made of hydrophilic material, are disposed between electrodes and electrically grounded liquid. If the capacitors are turned off, the liquid will exhibit an almost spherical surface, which is why only locally restricted light beams can be deflected according to the local curvature of the surface.

When realising a prism function for an extended light wave, a constant prism angle of the liquid prism is required across the entire diameter of the bundle of rays. In order to achieve this, the contact angles at the opposing electrodes are adjusted independent of each other by controlling the opposing electrodes with certain voltages. The control voltages can for example be chosen such that two opposing contact angles both have 90 degrees. In that case there is no prism effect, i.e. the liquid prism functions as a coplanar element. There are other pairs of control voltages, for example such that two opposing contact angles differ in their amount, but whose sum is 180 degrees. In that case the element functions like a prism. The electrodes can preferably be switched in pairs, so that deflections in both x direction and y direction can be realised, and that the visibility region can thus be tracked to the observer in these directions.

According to an alternative embodiment, an electrowetting liquid prism can also comprise a hollow body which is filled with multiple immiscible, optically transparent liquids. The refractive index changes at the interface between the liquids, so that the transmitted light is deflected. The advantage of using multiple, preferably two, liquids is that the liquids are encapsulated. This means that the hollow body is fully closed and completely filled with the liquids. In addition, gravity problems can be prevented by choosing liquids with suitable densities. This means that if both liquids have about the same density, their arrangement inside the hollow body will not or only insignificantly change due to the forces of gravity if the position of the prism is changed, or in case of shocks or vibration etc. Further, the base of the hollow body does not necessarily have to be rectangular, it can as well be a hexagon or octagon. It is further possible, that such liquid prisms are connected in series, i.e. multiple liquid prisms are disposed one behind another, seen in the direction of light propagation.

Thanks to the means according to this invention, the position of the visibility region can be adapted to the current eye position. The code on the light modulator is changed such that the reconstruction appears horizontally and/or vertically displaced and/or turned by an angle, according to the current position of the observer eye. In particular, it becomes possible to provide reconstructions which are fixed in space in front of the observer, and which allow a realistic adaptation of the observer perspective when an observer moves, or reconstructions with an exaggerated change in the observer perspective. The latter is defined as a type of reconstruction where the change in angle and position of the scene is greater than the change in angle and position of the observer.

Phase errors caused by field curvature in a reconstruction system can preferably be compensated by the light modulator SLM. Such phase errors can be compensated by an additional phase shift. Moreover, coma and astigmatism can also be reduced by appropriate encoding. The distortion can for example be compensated by selecting other pixels of the light modulator, i.e. by encoding the hologram values at modulator cell positions which were determined taking into consideration the extent of distortion. In a similar way, the aberrations of the entire reconstruction system are compensated by way of such corrective calculation in the light modulator. Generally, all and any aberrations of imaging means may be reduced or compensated by correcting the encoding of the light modulator.

The reconstruction system according to this invention allows changing positions of observer eyes for a holographic reconstruction with spatial light modulators of small size, and it allows large three-dimensional scenes to be watched easily. Because the direction of propagation of the modulated wave field is static and independent of the changing positions of the observer eyes in large parts of the reconstruction system, known measures to correct optical errors can be applied in a simple and cost-efficient manner, i.e. by way of optical design and by adequate encoding of the video holograms on the spatial light modulator. Two- and three-dimensional scenes can be shown simultaneously or one after another. Further, the reconstruction system makes relatively low demands on the manufacturing precision and on aberrations of the optical components. Optical errors can be corrected cost-efficiently with software the light modulator, and secondly, a low wave front distortion is only required across small regions of the large imaging means.

In the fix arrangement of the light sources in relation to the array of focussing means LA, only one light source is required per imaging element.

Generally, secondary light sources can also be used such that the light of one or multiple light sources is first focussed on a common focal point, and this focus then serves as a secondary light source which illuminates the lens. This preferably serves to increase the luminous intensity of the illumination.

The fix guidance of the wave field preferably facilitates the use of spatial filters which serve to suppress higher diffraction orders of the light modulator.

The present solution for tracking a visibility region to changing eye positions allows to provide a holographic display with wave propagation which is largely static and independent of movements of the observer eyes. Known measures to correct optical errors can thus be applied in a simple and cost-efficient manner, i.e. by way of optical design and by adequate encoding of the holograms on the spatial light modulator.

The invention claimed is:

1. Holographic reconstruction system with an optical system exit for a modulated wave field, comprising:
   (a) optical focusing means for imaging light sources with light waves which are capable of generating interference into a visibility region which lies in front of an eye position,
   (b) spatial light modulator means, which comprise modulator cells for modulating the wave field with video holograms and for holographically reconstructing object light points of a scene by way of interference of the modulated wave field,
   (c) a system controller with a hologram processor for re-computing the video holograms and with an eye finder, said system controller directing the light waves at least one current eye position and tracking the light waves accordingly when the eye position changes,
   where the optical focusing means comprise an array of focusing means with a multitude of focusing elements, and where each light source is assigned to at least one focusing element, thus forming a bundle of illumination units which jointly illuminate the light modulator means, wherein
      the reconstruction system further comprises electro-optical deflection means, which lie at the system exit, and which comprise at least one array of deflection means with controllable optical cells whose light exit direction can be controlled, so that each light source and each focusing element is assigned to at least one controllable optical cell,
      the system controller controls the electro-optical deflection means based on position signals which are detected by the eye finder such to serve an eye position which is determined by the content of the active video hologram, so to direct the focused, modulated light waves which are capable of generating interference at the at least one eye position, and
      the hologram processor controls the phase structure of the deflected propagating modulated wave field by way of accordingly encoding the modulator cells in order to provide a reconstruction of the scene through interference of the modulated wave field.

2. Holographic reconstruction system according to claim 1 where the controllable optical cells of the array of deflection means have the same matrix structure as the array of focusing means and the array of light sources.

3. Holographic reconstruction system according to claim 1, where the system controller realises with the help of the controllable optical cells of the array of deflection means a controllable optical prism function in order to laterally direct the modulated and focused light wave field, which is directed at a near-axis basic position, at the current eye position before the scene is reconstructed.

4. Holographic reconstruction system according to claim 1, where the system controller realises with the help of the controllable optical cells of the array of deflection means both a controllable optical prism function and a lens function in order to adapt the focal plane axially to the current eye position.

5. Holographic reconstruction system according to claim 4, where the array of deflection means comprise at least two array planes with controllable optical cells in order to realise lens functions in one array plane and prism functions in the other plane.

6. Holographic reconstruction system according to claim 1, where the system controller controls the controllable optical cells in one array of deflection elements such that they realise different prism angles in order to realise coincidence of the light waves coming from the deflection elements of the electro-optical deflection means in front of the current eye position.

7. Holographic reconstruction system according to claim 1 for a system with sequential encoding of video holograms for both eyes of observers, where the system controller periodically switches the electro-optical deflection means to serve different eye positions in synchronism with the currently encoded video hologram.

8. Holographic reconstruction system according to claim 7, where the electro-optical deflection means comprise mechanically joined controllable optical elements.

9. Holographic reconstruction system according to claim 7, where the eye finder controls the focal length of the controllable optical cells for axial tracking, and the prism function according to the current eye position for lateral tracking of the light waves.

10. Holographic reconstruction system according to claim 1, where at least two arrays of deflection means lie in the optical path, where deflection angles of deflection elements of the two arrays are disposed at an angle of 90° to each other in order to realise a two-dimensional, lateral wave tracking.

11. Holographic reconstruction system according to claim 1, where deflection elements of the at least one array of deflection means are electrowetting cells.

12. Holographic reconstruction system according to claim 11 for colour reconstructions with sequential monochromatic video holograms in the primary colours of video representations, where the system controller electrowetting cells are disposed in two planes in order to compensate colour dispersion among the video holograms by changing the deflection angle for colour reconstructions with sequential video holograms.

13. Holographic reconstruction system according to claim 12 for colour reconstructions with coloured video holograms, where two electrowetting cells in the optical path are arranged in series and have materials which differ in refractive index, so to realise achromatic optical deflection elements.

14. Holographic reconstruction system according to claim 1, where the optical deflection elements comprise combined optical elements which have a fixed prism component and a controllable prism component, so that the controllable prism component only needs to realise smaller deflection angles and thus only requires lower control voltages.

* * * * *